United States Patent [19]
Hara et al.

[11] Patent Number: 4,918,631
[45] Date of Patent: Apr. 17, 1990

[54] COMPACT TYPE ELECTRONIC INFORMATION CARD

[75] Inventors: Kazuya Hara, Tokorozawa; Kenji Rikuna, Tanashi, both of Japan

[73] Assignee: Casio Computer Co., Ltd., Tokyo, Japan

[21] Appl. No.: 91,959

[22] Filed: Sep. 1, 1987

Related U.S. Application Data

[63] Continuation-in-part of Ser. No. 746,200, Jun. 18, 1985, Pat. No. 4,749,982.

[30] Foreign Application Priority Data

Sep. 7, 1984 [JP] Japan .................. 59-135698
Jul. 22, 1987 [JP] Japan ................ 62-111330[U]

[51] Int. Cl.$^4$ ................... G06K 5/00; G06F 7/02
[52] U.S. Cl. ................... 364/708; 340/146.2; 235/380
[58] Field of Search ............... 364/708, 712; 340/146.2; 235/380, 382

[56] References Cited

U.S. PATENT DOCUMENTS

| | | | |
|---|---|---|---|
| 3,971,916 | 7/1976 | Moreno | 364/200 |
| 4,042,777 | 8/1977 | Bequaert et al. | 179/79 |
| 4,105,156 | 8/1978 | Dethloff | 235/441 |
| 4,151,596 | 4/1979 | Howells | 364/709 |
| 4,158,230 | 6/1979 | Washizuka et al. | 364/708 |
| 4,267,578 | 5/1981 | Vetter | 364/709 |
| 4,408,119 | 10/1983 | Decavele | 235/382 |
| 4,442,345 | 4/1984 | Mollier et al. | 235/380 |
| 4,449,040 | 5/1984 | Matsuoka et al. | 235/380 |
| 4,453,074 | 6/1984 | Weinstein | 235/380 |
| 4,484,067 | 11/1984 | Obrecht | 235/380 |
| 4,558,427 | 12/1985 | Takeuchi et al. | 364/708 |
| 4,614,861 | 9/1986 | Pavlov et al. | 235/380 |
| 4,627,736 | 12/1986 | Komaki | 364/708 |
| 4,634,845 | 1/1987 | Hale et al. | 235/380 |
| 4,650,981 | 3/1987 | Foletta | 235/380 |
| 4,670,664 | 6/1987 | Hara | 364/712 |
| 4,675,787 | 6/1987 | Suwa | 346/708 |
| 4,680,724 | 7/1987 | Sugiyama et al. | 364/708 |
| 4,749,875 | 6/1988 | Hara | 364/712 |
| 4,754,418 | 6/1988 | Hara | 364/708 |

FOREIGN PATENT DOCUMENTS

| | | |
|---|---|---|
| 0167044 | 8/1986 | European Pat. Off. |
| 125754 | 6/1984 | Japan |
| 138250 | 7/1984 | Japan |
| 140006 | 7/1984 | Japan |
| 135698 | 9/1984 | Japan |

*Primary Examiner*—David H. Malzahn
*Attorney, Agent, or Firm*—Frishauf, Holtz, Goodman & Woodward

[57] ABSTRACT

An intelligent card has a calculation function and a card holder collation function, and is formed to have the same size as that of a credit card. With the collation function, numeral data input from a key input section of the card is collated with identification data prestored in an internal integrated memory circuit. A so-called IC card itself is relatively expensive. However, the intelligent card of this invention additionally has a calculation function, and the IC card function can be provided inexpensively.

32 Claims, 15 Drawing Sheets

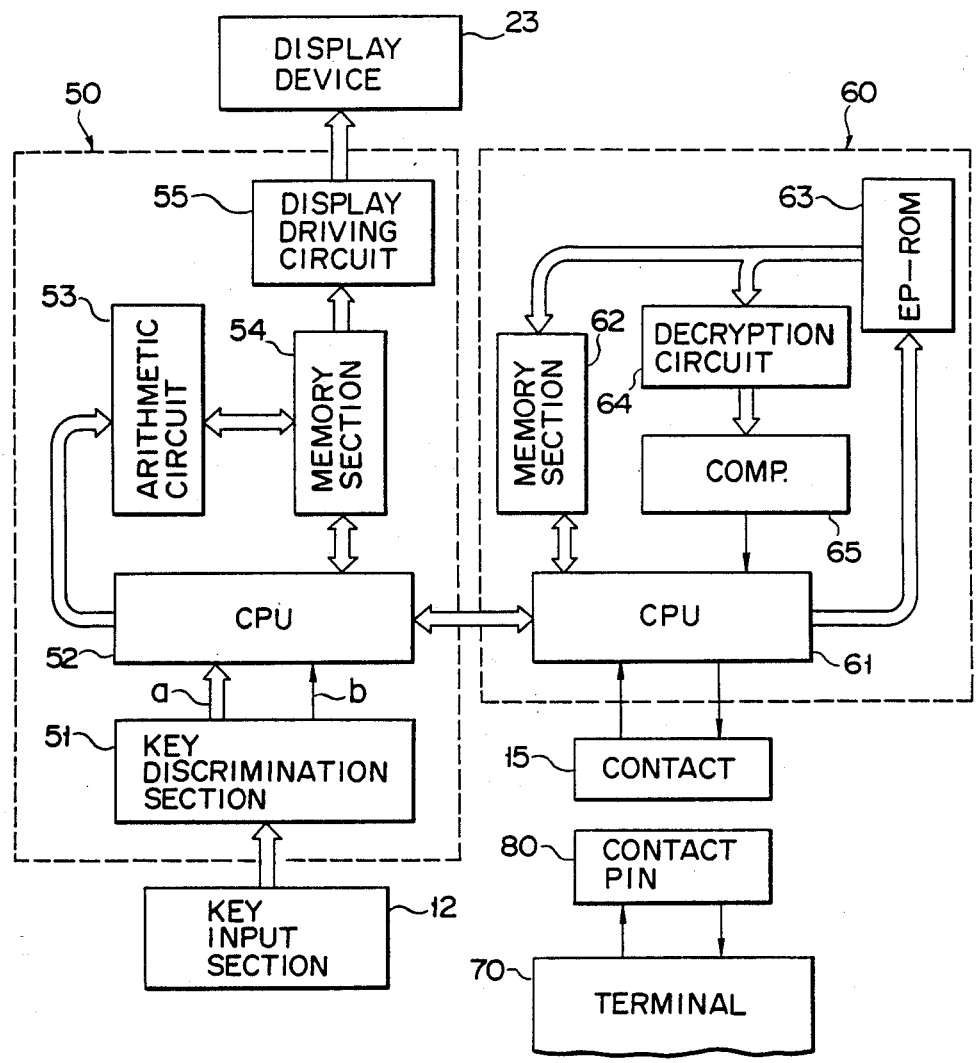
F I G. 10

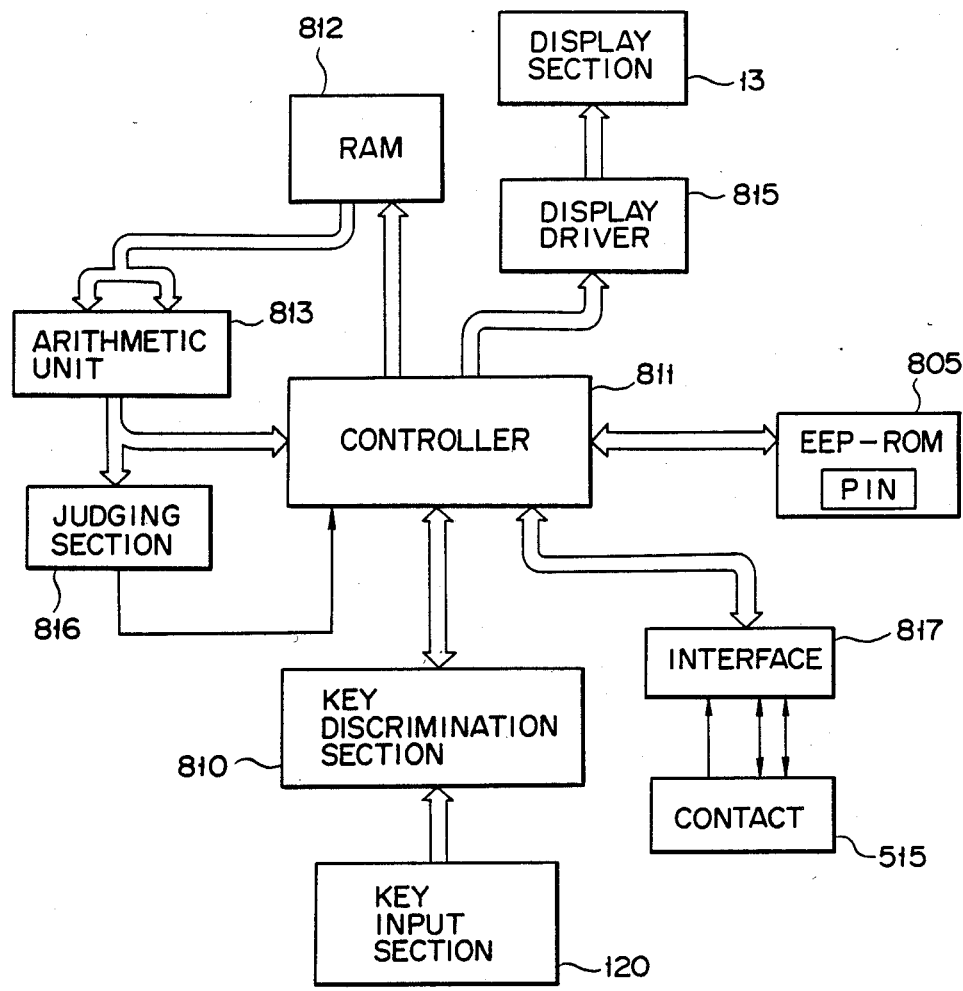
F I G. 15

COMPACT TYPE ELECTRONIC INFORMATION CARD

BACKGROUND OF THE INVENTION

This is a continuation-in-part of U.S. patent application Ser. No. 746,200 filed June 18, 1985 now U.S. Pat. No. 4,749,982.

The present invention relates to an intelligent card which can identify the authenticity of its holder.

In so-called cash and credit cards, embossed characters and a magnetic recording coating are formed on the surface of a plastic plate. However, since these conventional cards have a poor identification capability for determining whether or not a user is valid, they can be used by people other than the authorized card holders. For this reason, a card (i.e., an IC card) having a higher identification capability has been developed and used in practice. An IC chip is embedded in the IC card to effectively prevent people other than the authorized card holder from using the card or counterfeiting it. A connecting terminal is arranged on the surface or edge of the IC card. When the IC card is set in a terminal device installed at, for example, a bank, the IC chip in the IC card is electrically connected to the terminal device through the connecting terminal. The IC chip is energized from the terminal device through the connecting terminal, and an identification number is entered at the keyboard in the terminal device. The identification number prestored in the IC chip is read out and compared with the entered identification number in the terminal device so as to determine whether or not the current card user corresponds to the authorized card holder.

However, in a conventional IC card, the IC chip is simply embedded in the card body, so that the terminal device must be used to identify the card user. Terminal device costs are relatively high and impose a load on a retail store with a relatively small capital. In addition to this disadvantage, the card holder must enter the identification number in the presence of a store clerk, so that secrecy of the identification number cannot be guaranteed.

SUMMARY OF THE INVENTION

It is an object of the present invention to provide an intelligent card which can identify a card holder and can prevent use of the card by people other than the authorized card holder and prevent counterfeiting of the card.

According to the present invention, there is provided an intelligent card comprising: upper cover means having a plurality of key operation sections for inputting numeral data and collation instruction data; an electronic component assembly includng integrated circuit means having memory means prestoring identification data for collating the identification data with numeral data input from said key input portions and generating a signal indicating the collation result, display means connected to said integrated circuit means for displaying the collation result, and battery means for supplying a power source voltage to said integrated circuit means; and lower cover means, having substantially the same surface size as that of said upper cover means for carrying said electronic component assembly.

BRIEF DESCRIPTION OF THE DRAWINGS

FIG. 10 is a block diagram of the circuit of the intelligent card shown in FIG. 5;

FIG. 15 is a block diagram of the intelligent card shown in FIGS. 11A and 11B.

DETAILED DESCRIPTION OF THE PREFERRED EMBODIMENTS

Figure 1A:
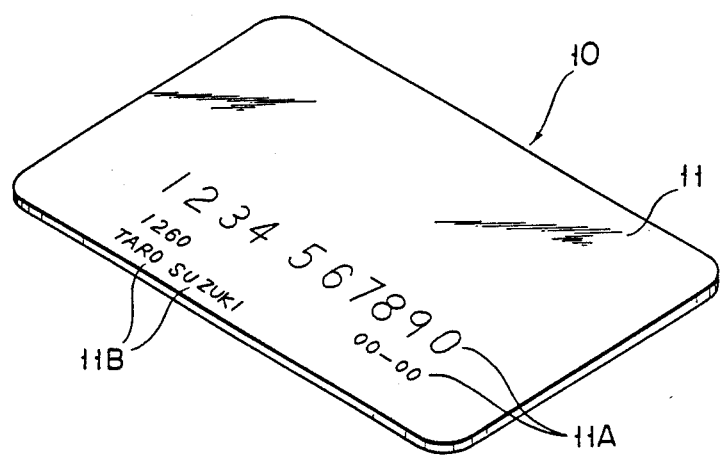
FIGS. 1A and 1B are perspective views showing the upper and lower surfaces of an intelligent card according to a first embodiment of the present invention, respectively.
Figure 1B:
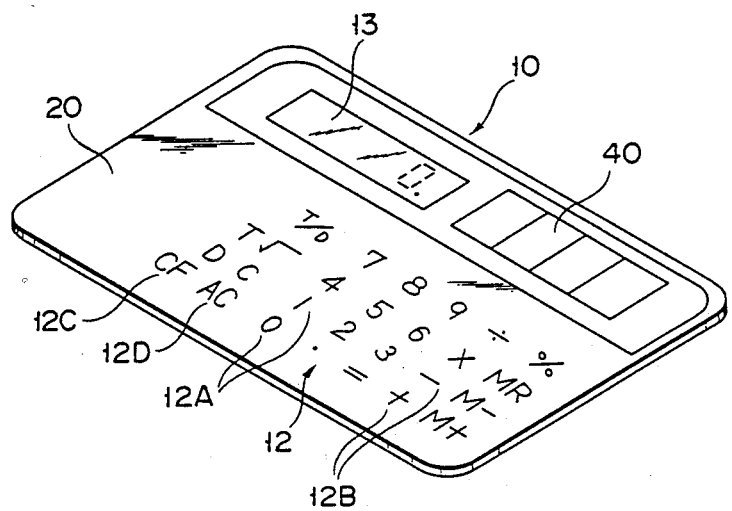

FIGS. 1A and 1B are respectively perspective views showing the upper and lower surfaces of an intelligent card which adapts the present invention. Reference numeral 10 denotes a card body. Characters are embossed in an uppermost sheet 11 to represent an identification code 11A, a card holder name 11B and the like. A receipt can be issued by an emboss-in-printer or the like after the card as shown in FIG. 1A is set in the printer.

A keyboard 12, an LC (liquid crystal) display device 13 and a solar cell 40 are mounted on a lowermost sheet 20, and an LSI (to be described later) is incorporated in the card body 10 to constitute a compact electronic calculator.

A collation function key (i.e., a CF key) 12C is arranged in the keyboard 12 to enter an identification number, in addition to numeric keys 12A and function keys 12B.

The intelligent card has substantially the same thickness as that (0.8 mm) of a cash card and a size complying with ISO standards. The intelligent card has both cash card and calculator functions.

The internal structure of the body 10 will be described later.

Figure 2:
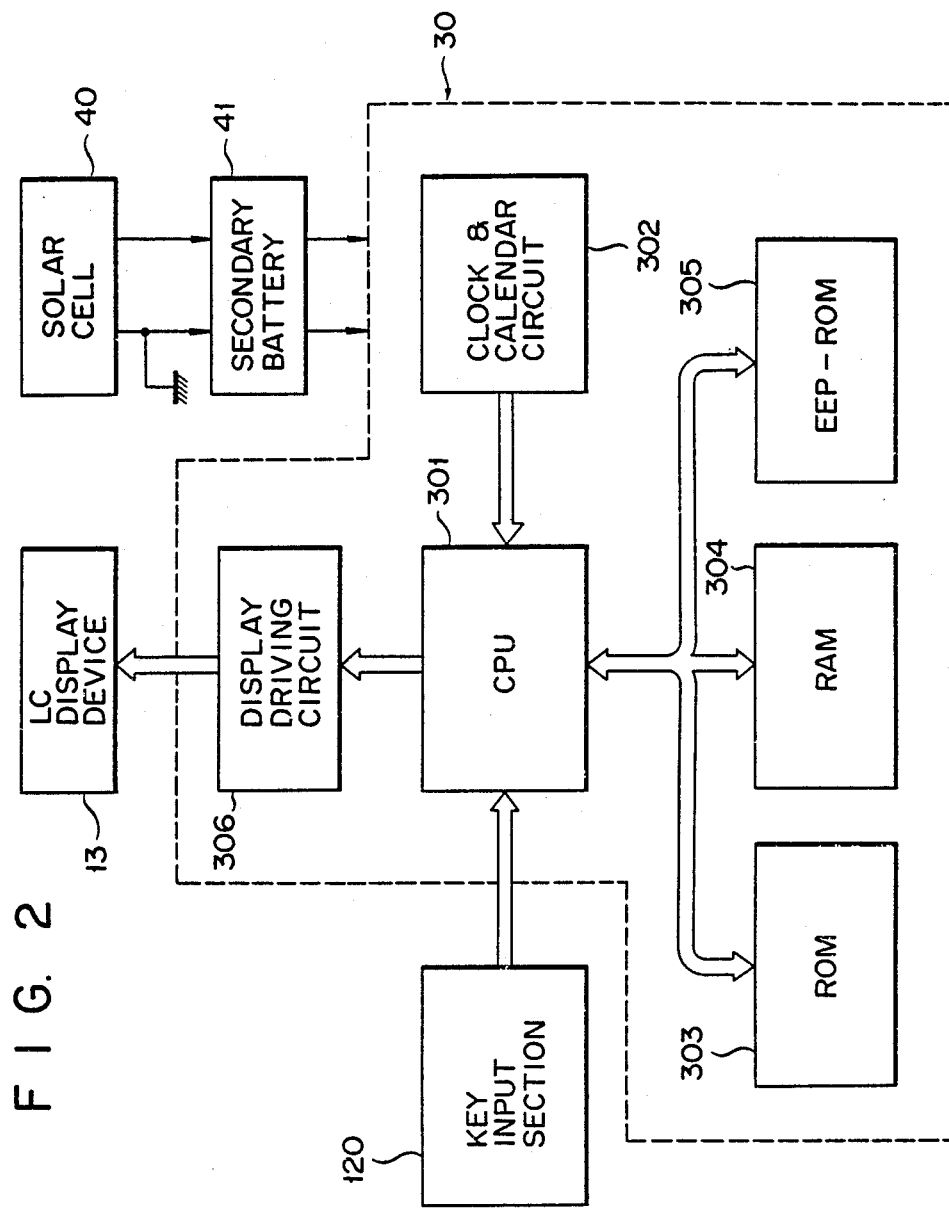
FIG. 2 is a block diagram of a circuit of the intelligent card shown in FIGS. 1A and 1B.

FIG. 2 is a block diagram of the circuit of the intelligent card described above. Reference numeral 120 denotes a key input section including the keyboard 12.

The section 120 supplies a key input signal to a CPU (Central Processing Unit) 301 in an LSI 30.

The CPU 301 is connected to a clock & calendar circuit 302, a ROM 303, a RAM 304, an EEP-ROM (Electronic Erasable Programmable ROM) 305, and a display driving circuit 306, thereby constituting the LSI 30.

The ROM 303 stores microinstructions for executing various types of instructions. The RAM 304 has an arithmetic register and other temporary storage registers. Various types of operations such as arithmetic calculations are performed between the CPU 301 and the RAM 304 on the basis of control by the ROM 303.

An arithmetic result obtained by the arithmetic calculation described above and numeric data entered at the section 120 are converted by the display driving circuit 306 so that the converted data are displayed on the device 13.

The clock & calendar circuit 302 includes a quartz oscillator and a frequency divider and measures the current time. At the same time, the circuit 302 calculates year, month and day in accordance with a date change signal. Therefore, the specific year, month and day can be displayed on the device 13.

The EEP-ROM 305 is a ROM whose data can be changed upon application of a predetermined high voltage thereto. When data is written in the EEP-ROM 305, data can be held without a back-up battery in the same manner as in a static ROM.

For this reason, identification data representing an identification number or a membership number is prestored in the EEP-ROM 305. The identification number entered by the card user at the keyboard 12 is compared with the identification number prestored in the EEP-ROM 305 to determine whether or not the current card user corresponds to the authorized card holder. This comparison operation will be described in detail later.

The CPU 301, the circuit 302, the ROM 303, the RAM 304, the EEP-ROM 305 and the circuit 306 are integrated as the one-chip LSI 30.

The LSI 30 is energized by a secondary battery 41 which is powered by the solar cell 40.

Even during shielding of the cell 40 from external light or during nighttime, the battery 41 energizes the LSI 30, so that the LSI 30 will not fail to provide prescribed functions.

Figure 3:
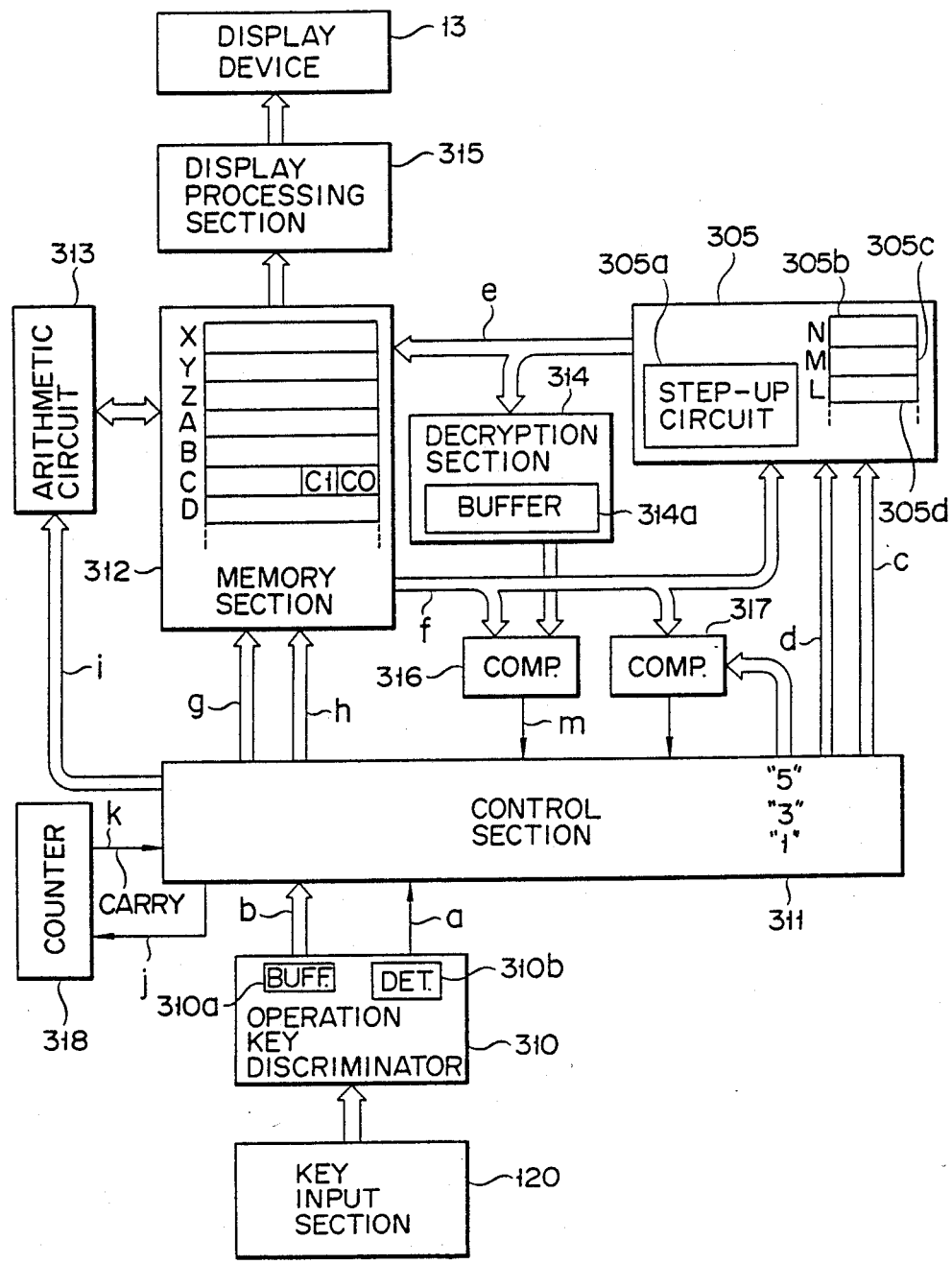
FIG. 3 is a diagram showing the function blocks of the circuit of FIG. 2.

In order to best understand the present invention, the function blocks of the LSI 30 of FIG. 2 are illustrated in FIG. 3. The same reference numerals in FIG. 3 denote the same parts as in FIG. 2.

An operation key discriminator 310 is connected to the section 120 to decode a key input signal entered at the section 120, thereby discriminating the depressed key. When the CF key 12C is depressed, the discriminator 310 generates an output signal from a line a. However, when another key such as the key 12A or 12B is depressed, the discriminator 310 supplies a corresponding output signal to a control section 311 through a bus line b.

The section 311 is connected to a memory section 312 of the RAM 304, an arithmetic circuit 313 and the EEP-ROM 305.

The EEP-ROM 305 comprises a step-up circuit 305a for boosting a supply voltage to a high voltage, 21 volts, in this case, to write data, an area N (305b) for storing a predetermined identification number, an area M (305c) for storing the number of times of noncoincidence as a result of comparison between the number entered at the keyboard 12 and the prestored identification number, and an area L (305d) for storing an invalid flag representing that the card is invalidated.

The identification number stored in the area N (305b) is stored in an encrypted form so as to prevent counterfeiting. The encrypted data is decrypted by a decryption section 314 to binary coded decimal data. The binary coded decimal data is temporarily stored buffer 314a. The encrypted identification number is decrypted by an encoder comprising the ROM 303. When the binary coded decimal data is coded by an RSA method and the like, the data is decrypted in accordance with an algorism by using a prescribed decryption key.

The section 311 controls read/write access and addressing of the EEP-ROM 305 through bus lines c and d.

The memory section 312 comprises arithmetic registers consisting of X, Y and Z registers and a temporary storage register including A to D registers. The section 312 exchanges data with the EEP-ROM 305 through bus lines e and f. The section 312 receives register instructions from the section 311 and numeric data and code data (constant) through bus lines g and h.

In the section 312, the A register stores the numeric data (i.e., input identification number) entered at the section 120, the B register stores the number of times of noncoincidence as a result of comparison between the input identification number and the identification number stored in the area N (305c) of the EEP-ROM 305, and the C register stores a flag which is set upon invalidation of the card. The section 312 is connected to a display processing section 315, so that the display data stored in the section 312 is properly processed by the section 315 and is displayed on the device 13.

The arithmetic circuit 313 is connected to the sections 311 and 312 to perform various arithmetic calculations using the X, Y and Z registers. The circuit 313 also increments the content of the B register by one so as to update the number of times of noncoincidence between the input identification number and the stored identification number. These calculations are performed under the control of the section 311 through a bus line i.

Reference numerals 316 and 317 denote comparators, respectively. The comparator 316 compares the content of the buffer 314a with the content of the A register. The comparator 317 compares the content of the B register with the constant "5" supplied from the section 311 and checks whether or not the number of times of noncoincidence has reached "5". Comparison results from the comparators 316 and 317 are supplied to the section 311.

The section 311 is also connected to a counter 318. The counter 318 serves to display a 10-second display of "OK" when the input identification number is identical with the stored identification number. The counter 318 is started in response to a start signal supplied from the section 311 through a line j and generates a carry signal to the section 311 through a line k, so that the section 311 can determine that 10 seconds have elapsed.

The operation of the intelligent card according to this embodiment will be described with reference to FIG. 4.

Figure 4:
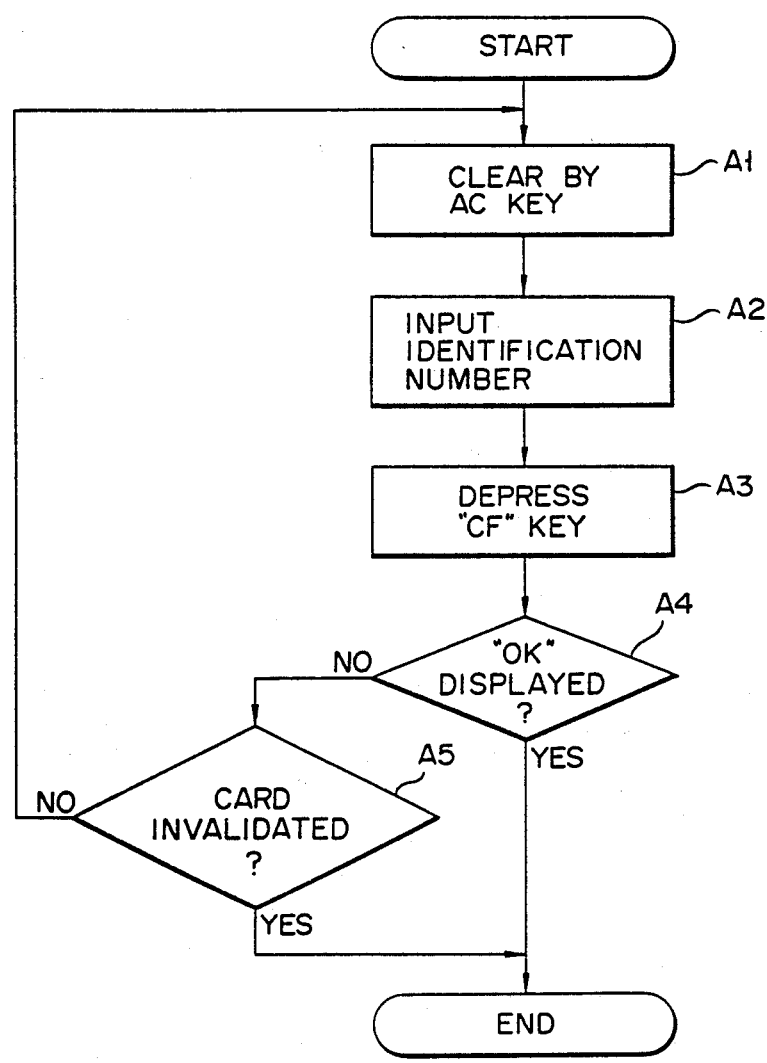
FIG. 4 is a flow chart for explaining the operation associated with the user.

FIG. 4 shows an operation of a card user when the input identification number is to be collated with the stored identification number. Assume that the card user uses the intelligent card as a credit card at a store, instead of paying cash when he purchases an item. The user depresses an AC key (i.e., all clear key) 12D in the keyboard 12 to clear the display (step A1). The user then enters an identification number by using the keys 12A on the keyboard 12 (step A2). This key input operation must be performed without being observed by a store clerk.

When the user completely enters the identification number, the input number is displayed. The collation function key (CF key) 12C is depressed to clear the number displayed on the screen (step A3). The input identification number is compared by an internal circuit of the LSI 30 with the stored identification number. When a coincidence between these identification number is established, "OK" is displayed on the device 13. The card user shows the "OK" mark to the store clerk, thereby identifying that the card user is the authorized card holder (step A4).

When the "OK" mark is displayed, the clerk identifies that the card user corresponds to the authorized card holder. The clerk then sets the card in the emboss-in-printer in the same manner as a regular credit card, thereby issuing a receipt.

However, when the identification number entered at the keyboard 12 does not correspond to that stored in the memory 305, the "OK" mark is not displayed. In this case, the card user must reenter the identification number (step A2).

When the input identification number does not coincide with the stored identification number five consecutive times, the card is invalidated since the terminal device determines that the card user does not correspond to the authorized card holder. At the same time, "EE . . . E" is displayed on the device 13 to indicate that the card is invalidated (step A5).

Figure 5:
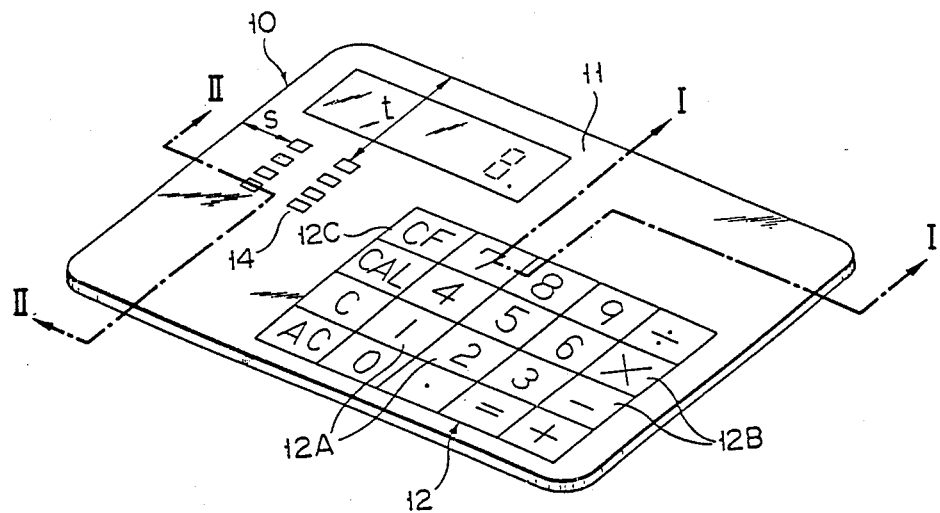
FIG. 5 is a perspective view showing the outer appearance of an intelligent card according to the second embodiment of the present invention.

In the above card, the function of causing a store clerk to check a collation result of the identification numbers can include a function of transmitting the collation result to a card terminal to determine if the credit sales is allowed. A card of this type as a second embodiment of the present invention will now be described with reference to FIGS. 5 to 10. FIG. 5 shows the detailed outer appearance of the upper surface structure of the intelligent card of this embodiment. The upper surface of a case body 10 is covered with a flexible uppermost sheet 11 of transparent polyester or the like. A key input section 12 having a numeric data input section 12A, an arithmetic function data input section 12B and a collation instruction input section 12C is constituted such that corresponding characters are printed on the lower surface of the uppermost sheet 11. A transparent window of a display section 13 and contact openings 14 are formed in the uppermost sheet 11. Distal ends of a plurality of metal contacts 15 are exposed in the openings 14. The contacts 15 constitute a matrix of 2 columns×4 rows. The distal end of each rectangular contact 15 has a length L=2 mm and a width W=1.7 mm. The contacts 15 are arranged in units of 4 at intervals of 2.54 mm along the width of the case body 10 in two columns. A distance between the contact columns is set to be 7.62 mm. A distance S between the left short side of the case 10 and the left column contacts 15 is 10.25 mm, and a distance t between the upper long side of the case body 10 and the uppermost contacts 15 is 19.23 mm. The dimensions preferably comply with TC97/SC17 in the ISO standards. It should be noted that the contacts 15 are not indispensable to the present invention and can be arranged as needed. The outer dimensions of the case 10 are the same as those (i.e., a thickness of 0.8 mm, a length of 85.5 mm and a width of 54 mm) of a credit card which has embossed characters (to be described) and which complies with the ISO 2894.

The internal structure of the intelligent card shown in FIG. 5 will be described with reference to FIGS. 6, 7, 8A to 8H and 9. Referring to these figures, an upper sheet 16, a frame 17, an adhesive sheet 18, a lower sheet 19 and a lowermost sheet 20 are sequentially bonded under the sheet 11 to constitute the case body 10. A spacer 21 and a wiring board 22 overlap each other and are disposed in a space A in the frame 17 defined by the sheets 16 and 18. A liquid crystal display device 23 is inserted in a space B. A paper-like battery 24 is inserted in a space C. A through hole 161 is formed in a portion of the sheet 16 which corresponds to the device 23. A recess 191 is formed in a portion of the sheet 19 which corresponds to the through hole 161. A recess 192 is formed in the sheet 19 so as to correspond to the battery 24. A partially punched projection 193 is formed in the recess 192 so as to extend toward the battery 24. A partially punched projection 162 is formed in a portion of the sheet 16 which corresponds to the projection 193 and extends toward the battery 24.

The eight contacts 15 formed on the board 22 extend therefrom. These contacts 15 are sequentially inserted in contact holes 211 formed in the spacer 21, contact holes 163 formed in the sheet 16 and openings formed in the sheet 11.

The board 22 is made of a flexible material such as glass epoxy resin having relatively large rigidity. A plurality of fixed contact pairs 221 each having a pair of contacts 221a and 221b are formed at portions of the board 22 which correspond to the respective keys of the section 12. Each contact 15 comprises a copper film 15a having a gold-plated layer 15b thereon. The thickness of the contact 15 is about 0.03 to 0.05 mm.

An IC chip 30 for performing normal arithmetic operations such as four basic arithmetic calculations and an IC chip 31 for storing and collating the identification code are mounted on the board 22. More specifically, the chips 30 and 31 are inserted in through holes 222 and 223 formed in the board 22, respectively, and their terminals are bonded to a conductive film 224 formed on the lower surface of the board 22. A gold wire 31a is bonded to the chip 31, and the resultant structure is sealed with a resin material 31c. The contacts 15 are connected to the conductive films from the upper surface to the lower surface of the board through corresponding through holes 225 and are connected to predetermined terminals of the chip 31. The respective terminals of the chip 30 are connected to the fixed contacts 221a and 221b and terminals 226 connected to a connecting terminal 23a of the device 23.

The chips 30 and 31 slightly extend from the lower surface of the board 22. The extended portions of the chips 30 and 31 are fitted in the recesses 194 and 195 formed in the sheet 19, respectively.

A plurality of openings 164 and a plurality of openings 212 are formed in the sheet 16 and the spacer 21 so as to correspond to the fixed contact pairs 221 formed on the board 22, respectively. Movable contacts 111 are formed on the lower surface of the sheet 11 so as to oppose the contact pairs 221.

The sheets 16 and 19 are made of thin metal sheets of stainless steel or beryllium steel. The openings 161, 163 and 164 and the recesses 191 and 192 are formed by etching. The spacer 21 has a synthetic film base having adhesive layers on its upper and lower surfaces and is adhered between the sheet 16 and the board 22. The upper surfaces of the chips 30 and 31 are adhered to the spacer 21.

The device 23 comprises a low-profile device wherein a liquid crystal element is sealed between a pair of transparent base films of polyester or polysulfone. The device 23 is inserted in the space B. A film-like heat-sealed connector 23a is connected to the connecting terminals 226 formed on the lower surface of the board 22.

The paper-like battery 24 fitted in the space C of the frame 17 has a negative electrode 241 on its upper surface and a positive electrode 242 on its lower surface. The electrodes 241 and 242 comprise thin conductive metal films of aluminum or stainless steel. An electric power generation unit 243 is inserted between the electrodes 241 and 242. The unit 243 is constructed in the same manner as a normal lithium battery such that a separator 246 obtained by impregnating an organic electrolytic solution in polypropylene unwoven fabric is inserted between a negative active material 244 of metal lithium and a positive active material 245 of manganese dioxide. In practice, the material 245 is printed on the inner surface of the positive electrode 242, and the material 244 is in contact with the negative electrode 241. A heat melting material 247 is adhered between the electrodes 241 and 242 to surround the unit 243.

The battery 24 is very thin and flexible and has high mechanical strength. The material 244 has a thickness of 50 $\mu$m to 80 $\mu$m, the material 245 has a thickness of 150 $\mu$m to 180 $\mu$m, the separator 246 has a thickness of 100 $\mu$m to 150 $\mu$m, the unit 243 has a thickness of 350 $\mu$m, and the electrodes 241 and 242 have thicknesses of 50 $\mu$m, respectively. Therefore, the battery 24 has a total thickness of 450 $\mu$m (0.45 mm).

In the above embodiment, the battery 24 comprises a rectangular member having a size of 34 mm$\times$17 mm and has an overall weight of 0.7 g. The discharge capacity of the battery 24 is 17 mA.

The battery 24 is connected to connecting terminals 37a and 37b formed on the upper and lower surfaces of the board 22 through a pair of power source leads 35 and 36. The terminals 37a and 37b are connected to the terminals of the chips 30 and 31 through conductive films 371a and 371b, so that the chips 30 and 31 are powered by the battery 24. The leads 35 and 36 are obtained such that a conductive metal is deposited or a conductive paint is patterned by screen printing on one surface of strip base films 35a and 36a of a synthetic resin. One end of each of the leads 35 and 36 is connected by a conductive adhesive to a corresponding one of the terminals 37a and 37b, and the other end thereof extends in the space C to be in contact with the electrodes 241 and 242 of the battery through the projections 162 and 193.

The sheet 11 is adhered to the upper surface of the sheet 16, and the sheet 20 is adhered to the upper surface of the sheet 19. A movable contact 111 printed on the lower surface of the section 12 of the sheet 11 is elastically deformed when pressed by a finger, and the contact 111 is urged against the contact 221 and electrically connects contacts 221a and 221b, so that a key switch is turned on. When the finger is released, the contact 221C is removed from the contact 221 by the elastic force of the sheet 11, so that the key switch is turned off.

As shown in FIG. 1A, an embossed portion including a holder's code number 11A and a card holder's name 11B can be formed on the sheet 20, as needed. A solar cell or a combination of a solar cell and the paper battery can be used as a power source in place of the paper battery 24. In this case, as shown in FIG. 1B, a light-receiving surface of the cell 40 is located and exposed at a position near the window of display device 13 of the sheet 11.

The intelligent card of the embodiment of FIGS. 1 and 5 can have the same thickness as that of the conventional credit card. More specifically, the chips 30 and 31, the device 23, and the battery 24 have a thickness of 0.5 mm, respectively, the sheets 11 and 16 have thicknesses of 0.07 mm and 0.05 mm, respectively, the spacer has a thickness of 0.03 mm, the frame 17 has a thickness of 0.4 mm, the sheets 18, 19 and 20 have thicknesses of 0.03 mm, 0.2 mm and 0.05 mm, and the recesses 191, 192, 194 and 195 of the sheet 19 have a depth of 0.1 mm. Therefore, the card 110 has an overall thickness of 0.8 mm.

The circuit arrangement of the intelligent card of FIG. 5 will be described with reference to the block diagram of FIG. 10. Referring to FIG. 10, the circuits arranged in the chips 30 and 31 are represented by dotted blocks 50 and 60, respectively. The block 50 provides a normal electronic calculator function. Key signals from the key switches constituted by the contacts 221a, 221b and 111 of the section 12 are fetched by a CPU 52 through a key discrimination section 51. The key signals supplied to the CPU 52 comprise a key signal b from the CF key 12C and a key signal a from the keys 12A and 12B excluding the CF key. Various calculations are performed using an arithmetic circuit 53 and a memory section 54 in response to the signal a under the control of the CPU 52. The key input data and the calculation results are displayed on the device 23 through a display driving circuit 55.

The circuit block 60 of the chip 31 has a CPU 61, a memory section 62, an electronic erasable-programmable ROM (EEP-ROM) 63, a decryption circuit 64 and a comparator 65. The EEP-ROM 63 stores an encrypted identification code for designating the authorized card holder.

Figures 6, 7, 9:
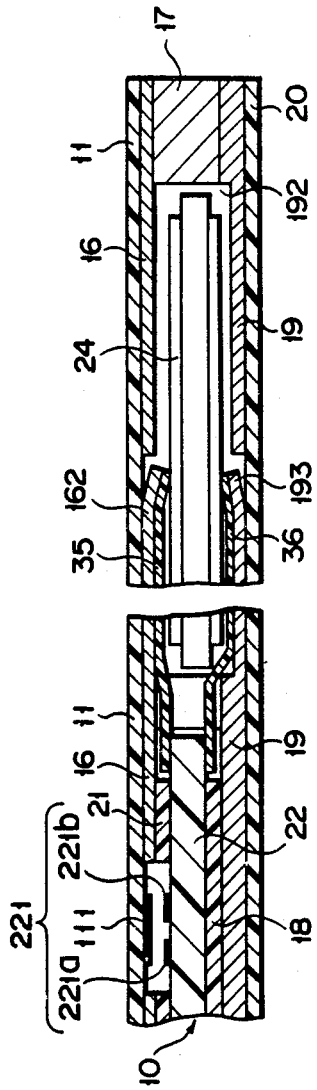
FIGS. 6 and 7 are sectional views of the intelligent card taken along the lines I—I and II—II of FIG. 5, respectively.
FIG. 9 is a sectional view of a battery shown in FIG. 8E.
Figure 8A:
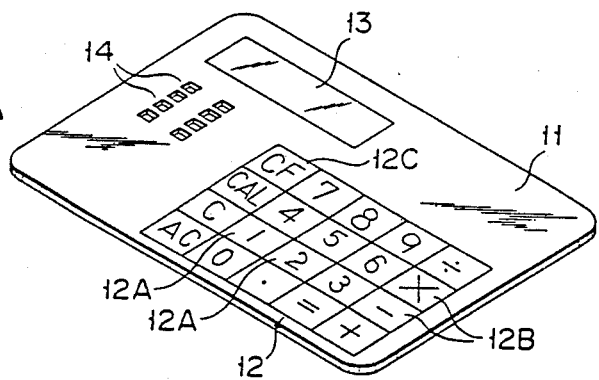
FIGS. 8A to 8H are respectively exploded perspective views showing the internal structure of the intelligent card of FIG. 5.
Figure 8B:
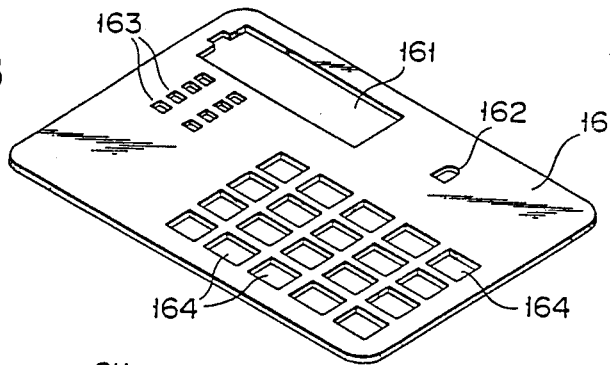
Figure 8C:
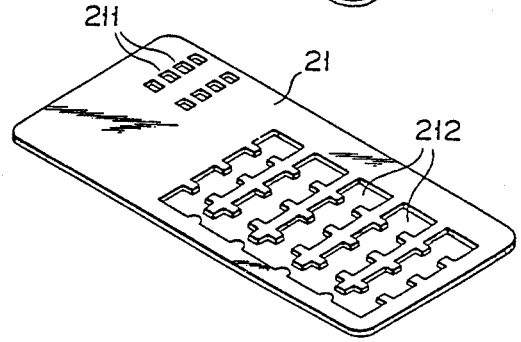
Figure 8D:
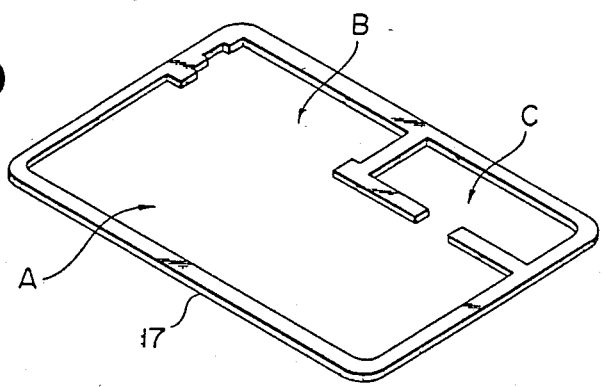
Figure 8E:
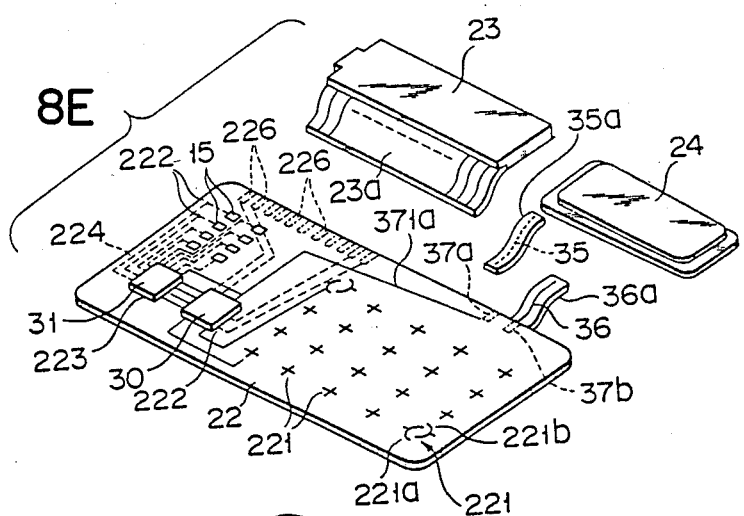
Figure 8F:
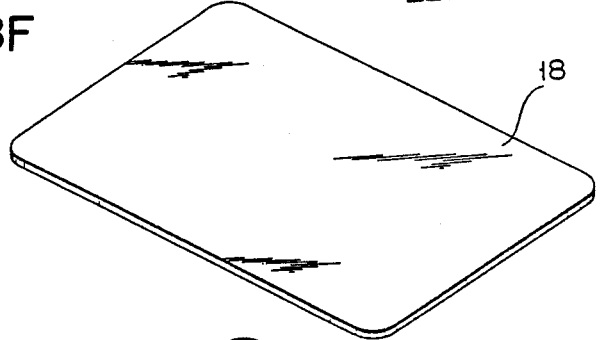
Figure 8G:
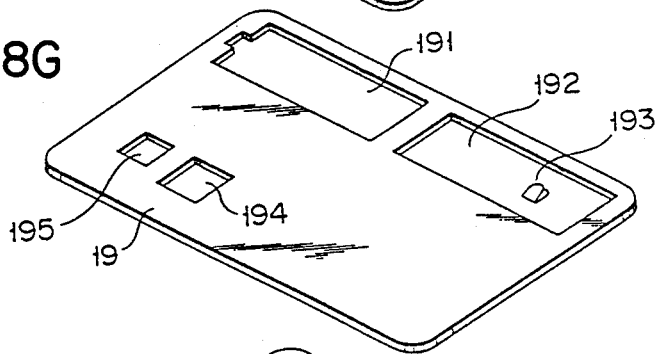
Figure 8H:
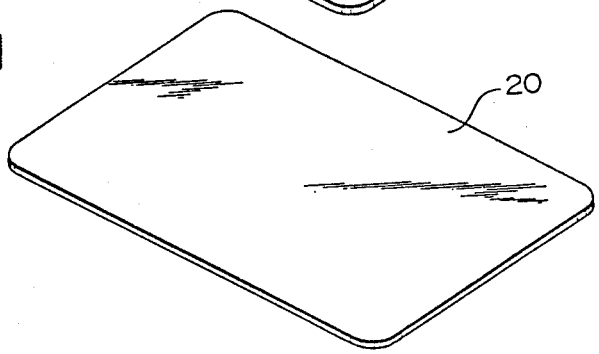

The CPU 61 is connected to the contacts 15. When the intelligent card 10 is inserted in a terminal such as a cash dispenser, contact pins 80 of the terminal are electrically connected with the contacts 15, as shown in FIG. 7. The eight contacts 15 comprise an address data input/output terminal, a clock terminal, a reset terminal, a power source VDD terminal, a GND terminal and an EEP-ROM write VCC terminal.

The intelligent card of this embodiment serves as an IC card for collating the identification number and as a compact electronic calculator for providing a calculation function. Unlike the IC card having only the identification function, the intelligent card can provide a value to be added. Since the identification and calculator functions are simultaneously used on a given occasion, the intelligent card can be conveniently used. Furthermore, the IC chips and metal contacts are supported by the insulating base fixed on the thin metal plate, so that the chips and contacts can be easily formed with high mechanical strength. In addition, the holding member of the metal contacts will not be substantially deformed by a pressure acting on the contact pins contacting the metal contacts, thereby guaranteeing stable electrical connections therebetween.

In the above description, two IC chips are used for calculation and identification, respectively. However, a single IC chip having both the calculation and identification functions can be used. In the above embodiment, the board 22 supports the contacts 221, the IC chips 30 and 31 and the metal contacts 15. However, the board can be properly divided, and the divided boards can be connected through flexible connectors. In addition, the board 22 need not be constituted by a single sheet. After an insulating material is coated on the sheet 19, a conductive pattern can be formed by printing or pattern transfer. In this case, the terminals of the chips 30 and 31 are connected to the conductive film of the tape carrier, and the conductive film is bonded to the conductive pattern, thereby achieving a chip-on-board scheme. The contacts 15 are inserted in the openings 14 of the sheet 11 (0.1 mm or less in the above embodiment). In order to allow easy removal of dust from the openings 14, a conductive metal film is coated to the same level as that of the upper surface of the sheet 11 or to extend upward therefrom. The contacts 15 are formed on the lower surface of the board 22, i.e., the surface of the board 22 which does not have the key switches. The power source battery comprises a paper-like battery in the above embodiment but can be replaced with a solar cell.

The intelligent card has the identification and compact calculator functions, so that the public consumers will appreciate that the intelligent card is a good buy. Since the IC chips and the metal contacts are mounted on the insulating base which is then mounted on a metal plate having larger flexibility than the insulating base, the IC chips and the metal contacts can be properly mounted with high mechanical strength protecting against an external impact and load, thus providing great practical advantages.

A third embodiment of the present invention will now be described with reference to FIGS. 11 to 15.

Figure 11A:
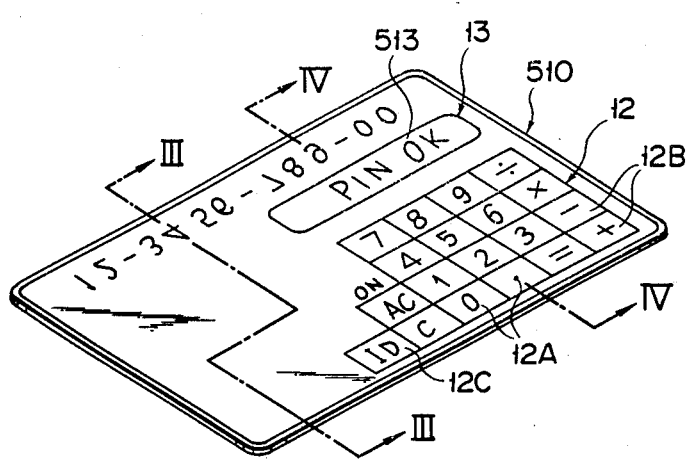
FIGS. 11A and 11B are respectively perspective views showing outer appearances of an intelligent card according to a third embodiment of the present invention.
Figure 11B:
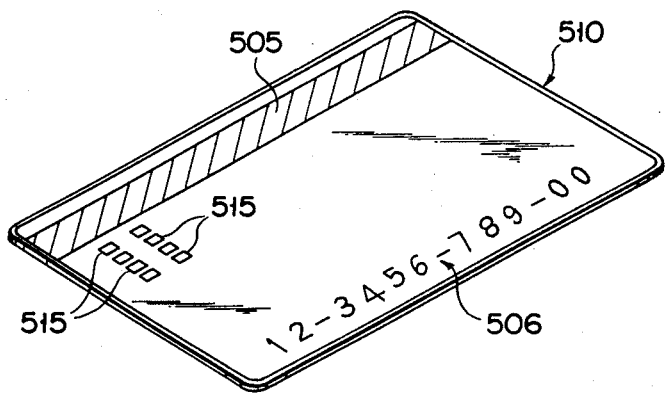

FIGS. 11A and 11B show the outer appearance of an intelligent card. Reference numeral 510 denotes a intelligent card body having outer dimensions, i.e., a length of 85.5 mm, a width of 54 mm, and a thickness of 0.8 mm (same as those of a credit card complying ISO standards). Key input section 12 comprising numerical keys, function keys, and a mode switch key (ID key), and display section 13 are arranged on the upper surface of card body 510, as shown in FIG. 11A. A plurality (8 in this embodiment) of card terminal connecting contacts are aligned in two lines on one side portion of the lower surface of card body 510, as shown in FIG. 11B. Magnetic stripe 505 recorded identification data such as a code number of a card issuer (e.g., a credit company, bank, or the like) or an account number of a card holder (a holder of an intelligent card), and embossed characters 506 such as the account number are respectively provided on the upper and lower edge portions of the lower surface of card body 510. Note that magnetic stripe 505 is prepared by adhering a magnetic tape onto the lower surface of card body 510, and embossed characters 506 are projected to the lower surface of card body 510 through the upper surface side.

Figure 12A:
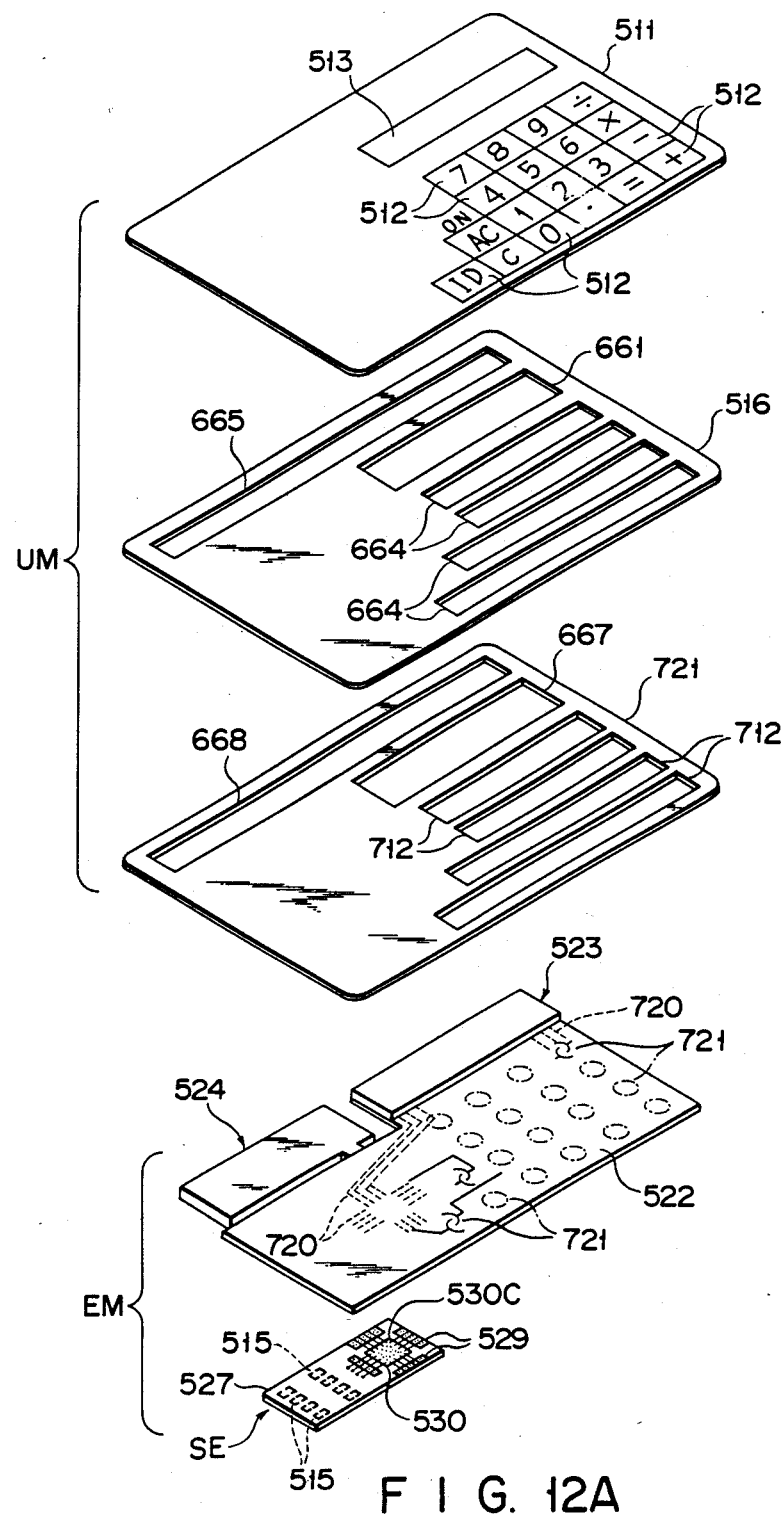
FIGS. 12A and 12B are exploded perspective views showing the internal structure of the intelligent card shown in FIGS. 11A and 11B.
Figure 12B:
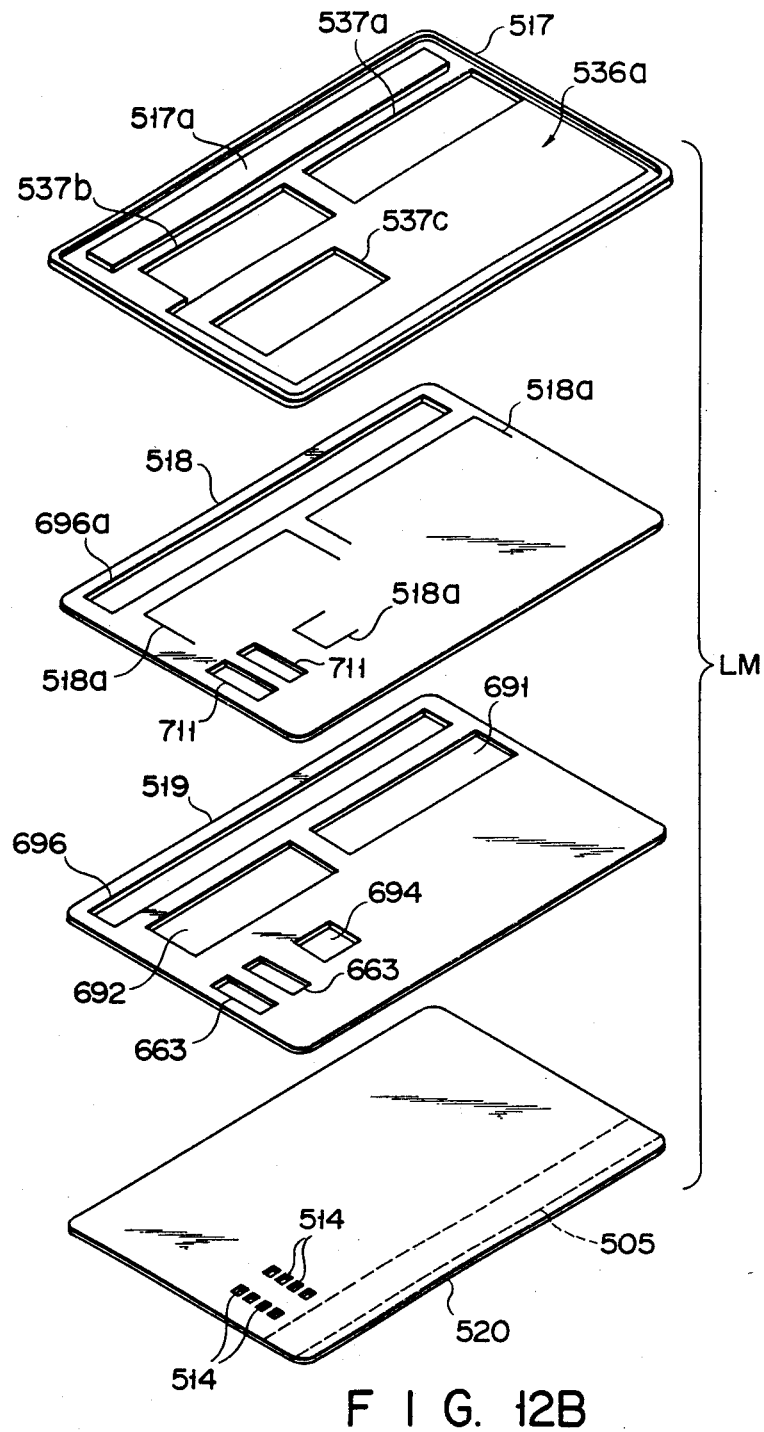
Figure 13:
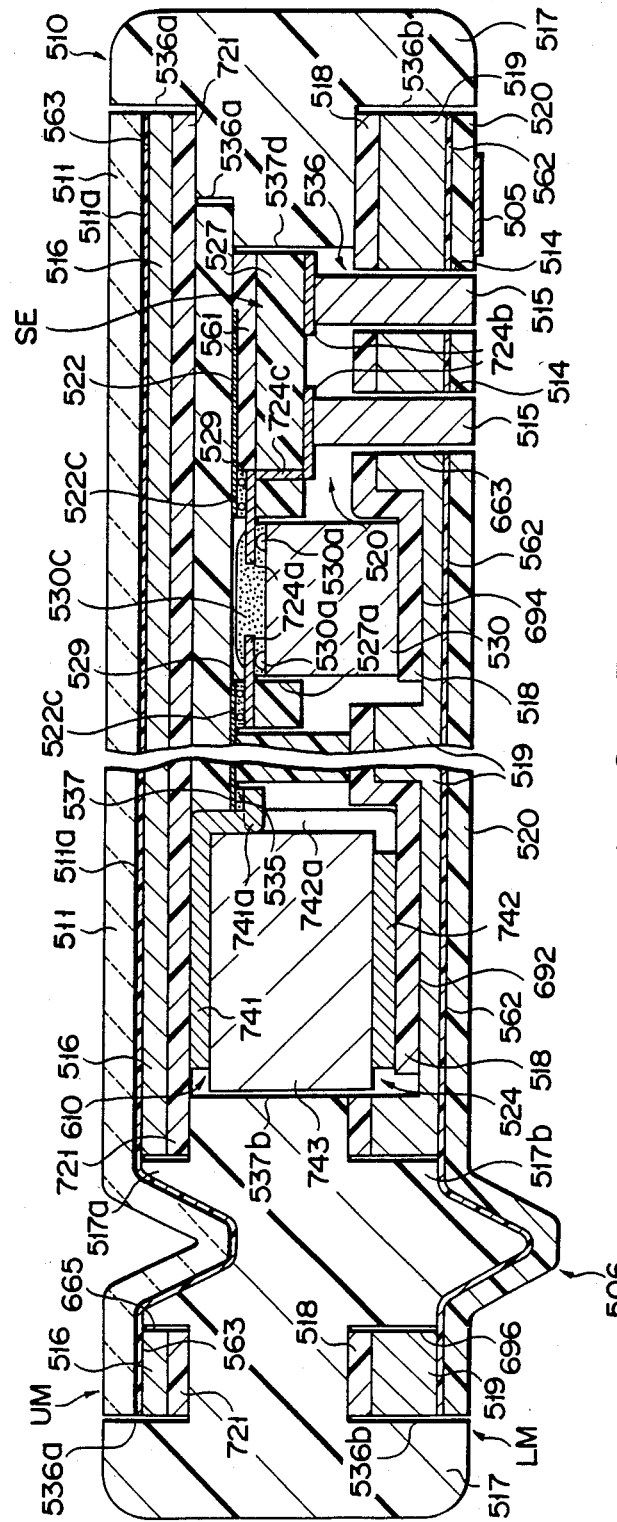
FIG. 13 is an enlarged sectional view of the intelligent card taken along line III—III in FIG. 11A.
Figure 14:
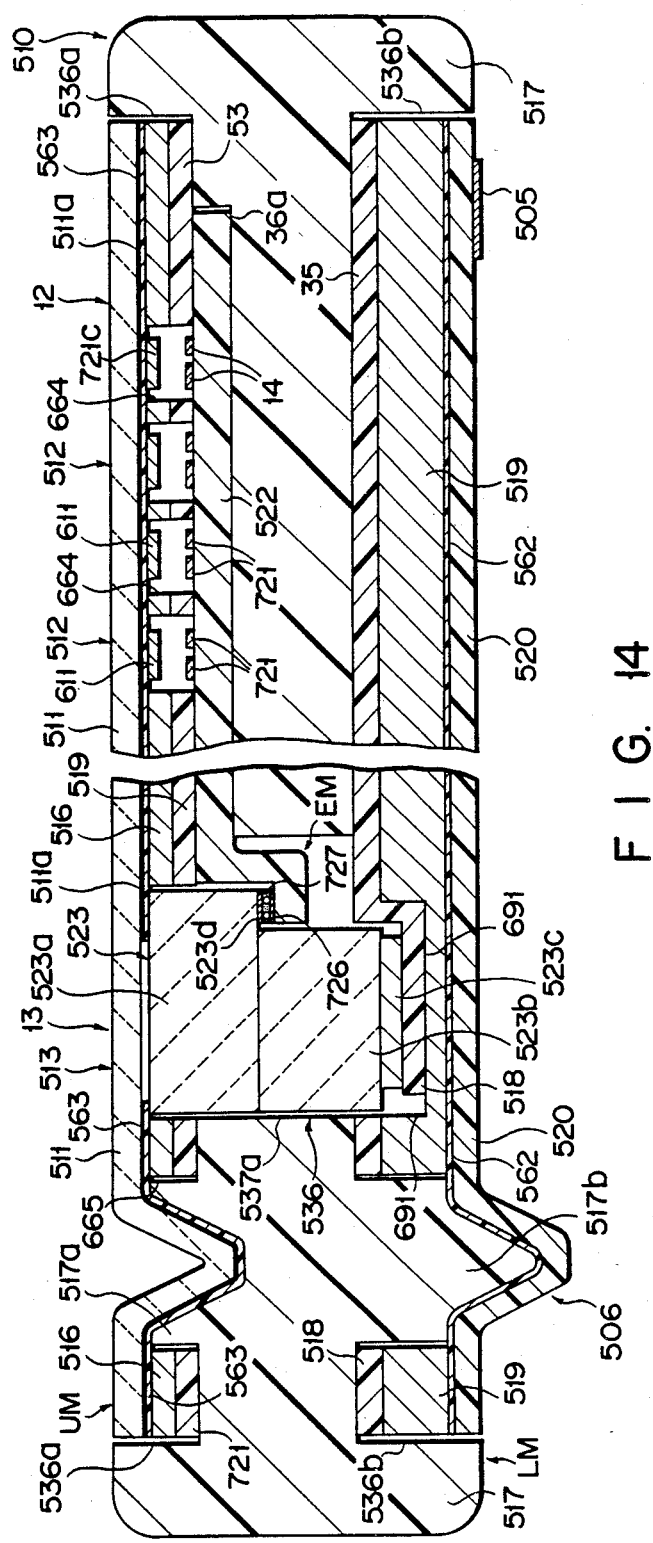
FIG. 14 is an enlarged sectional view of the intelligent card taken along line IV—IV in FIG. 11A.

FIGS. 12A and 12B are exploded perspective views of the intelligent card, and FIGS. 13 and 14 are respectively enlarged sectional views taken along lines III—III and IV—IV in FIG. 11A. In FIGS. 13 and 14, the drawings are compressed in the widthwise direction of the card for the illustrative convenience.

The intelligent card comprises electronic component assembly EM, and lower and upper covers LM and UM constituting card body 510.

The structure of electronic component assembly EM will be described below. Assembly EM comprises thin flat display panel 523, paper-like battery 524, wiring board 522, and IC/contact unit SE. In wiring board 522, a predetermined number of input movable key contacts 721 are formed in a matrix on the surface of a flexible board of, e.g., a polyester film, and predetermined wiring pattern 720 is formed on the rear surface thereof. Movable key contacts 721 are connected to wiring pattern 720 via corresponding through-holes (not shown). In display panel 523, a liquid crystal material (not shown) is filled between a pair of upper and lower transparent electrode substrates 523a and 523b, and reflection plate 523c is provided on the lower surface of lower substrate 523b, as shown in FIG. 14. Display panel 523 is arranged on the upper edge side of wiring board 522, and is connected to wiring pattern 720 at the upper edge portion of board 522, as shown in FIG. 12A. Referring to FIG. 14, reference numeral 523d denotes electrode terminals aligned on the side edge portion of the lower surface of upper substrate 523a of display panel 523; and 726, display panel connecting terminals aligned on the upper edge portion of the surface of wiring board 522. The terminal array portion of display panel 523 and wiring board 522 are adhered by anisotropically electric conductive adhesive (an insulating adhesive mixed with conductive particles) 727 by bending wiring board 522, as shown in FIG. 14. Battery 524 comprises an electromotive unit 743 sandwiched between a pair of upper and lower entire-surface electrode plates 741 and 742 of thin metal plates, as shown in FIG. 13. Battery 524 is arranged adjacent to display panel 523 on the upper edge side of wiring board 522, as shown in FIG. 12A. Battery 524 is connected to wiring board 522, such that lead terminal portions 741a and 742a extending from the side edges of electrode plates 741 and 742 are bent as shown in FIG. 13, and are bonded to battery connecting terminals 537 formed on the upper edge portion of the rear surface of wiring board 522 by conductive adhesive 535.

In IC/contact unit SE, IC chip 530 constituting a calculator circuit and a PIN collation circuit is mounted on small-area sub-board 527, and card terminal connecting contacts 515 are provided on the rear surface of sub-board 527. As shown in FIG. 13, sub-board 527 is prepared such that leads 724a and 724b of predetermined patterns are formed on front and rear surfaces of an insulating film (polyimide or polyester film) by etching of copper foil laminated to each of surfaces. The distal ends of leads 724a on the front surface extend inside IC chip storage opening 527a, and leads 724a and 724b on the front and rear surfaces are connected by through-hole plating layer 724c. The distal ends of leads 724a on the front surface are tin-plated. IC chip 530 is mounted on sub-board 527 such that the major surface portion of the chip 530 is inserted in IC chip storage opening 527a, and gold bumps 530a formed on electrode pads (not shown) of the chip are bonded to the distal end portions of corresponding leads 724a on the front surface. Note that reference numeral 530c denotes a protective resin bonded on the major surface of IC chip 530 after leads 724a are bonded. Leads 724b on the rear surface of sub-board 527 extend from the through-holes plating layers 724c to the alignment positions of contacts 515. Each contact 515 is gold-plated and is connected to corresponding lead 724b.

IC/contact unit SE is arranged on the rear surface of wiring board 522, as shown in FIG. 13. The proximal ends of leads 724a on sub-board 527 are adhered and connected to IC chip connecting terminals 522c formed on the rear surface of wiring board 522 by anisotropically electric conductive adhesive 529, and sub-board 527 is integrally adhered to the rear surface of wiring board 522 by insulating adhesive 561.

Lower and upper covers LM and UM constituting card body 510 of the intelligent card will now be described.

Lower cover LM is constituted by case body 517 formed of a thermoplastic polymeric resin such as a hard venyl chloride or a soft metal such as aluminum, reinforcing sheet 519 of a thin stainless steel plate, and lower sheet 520 formed of a polyester or soft venyl chloride film. Reinforcing sheet 519 and lower sheet 520 are laminated through adhesive 562, and case body 517 and reinforcing sheet 519 are adhered to each other by double-surface adhesive sheet 518. Storage recess 536a for electronic component assembly EM is formed one side of case body 517. Recess 536a stores upper cover UM and assembly EM. Storage recess 536b for lower cover LM is formed another side of case body 517. Display panel storage opening 537a, battery storage opening 537b and IC/contact unit storage opening 537c are formed inside case body 517. In addition, laterally elongated thick portions 517a and 517b for forming embossed characters are respectively projected from the bottom of recesses 536a and 536b of case body 517. Longitudinally elongated opening 696 for receiving thick portion 517b of the lower surface of the case body 517 and two longitudinally elongated openings 633 through which contacts 515 aligned on the lower surface of unit SE in two lines extend are formed on reinforcing sheet 519. Recesses 691 and 692 for receiving the lower part of display panel 523 and battery 524, and recess 694 for receiving the lower part of IC chip 530 are formed on sheet 519 by half-etching. Contact exposing openings 594 for exposing contacts 515 are formed on lower sheet 520 in correspondence with respective contacts 515. Magnetic stripe 505 is provided on the lower edge side of the lower surface (outer surface) of lower sheet 520. Laterally elongated opening 696 for receiving thick portion 517b and two longitudinally elongated openings 711 through which contacts 515 extend are formed on sheet 518 in the same manner as in sheet 519. In addition, U-shaped notches 518a along peripheries of recesses 691, 692, and 694 of reinforcing sheet 518 are formed on sheet 18. The portions of sheet 518 surrounded by notches 518a are pressed downward, and are bonded to the bottom of recesses 691, 692, and 694 of sheet 519, as shown in FIGS. 13 and 14. Laminated sheets 519 and 520 are stored in recess 536b of case body 517 through sheet 518 so that the outer surface of sheet 520 is on the same level as that of the peripheral portion of case body 517.

Upper cover UM is constituted by upper sheet 511 of a polyester film or soft vinyl chloride film, spacer sheet 516 of a thin stainless steel plate for supporting the upper sheet, and double-surface adhesive sheet 721. Display window 513 is formed on a portion of upper sheet 511 corresponding to the display region of display panel 523, and input operation portions 512 are formed on portions of sheet 511 corresponding to fixed key contacts 721 on wiring board 522. Key indicia are respectively printed on input operatin potions 512. Upper sheet 511 is prepared such that the key indicia are printed on the lower surface of a transparent sheet, and a decorative print layer 511a as a blindfold is performed on the entire surface of the sheet except for a portion coresponding to display window 523. Upper sheet 511 is laminated on the upper surface of spacer sheet 516 through adhesive 563 printed on print layer 511a except for display window 513, as shown in FIGS. 13 and 14. Movable key contacts 611 corresponding to fixed key contacts 721 on wiring board 522 are formed on the lower surface (on adhesive 563) of upper sheet 511 by printing carbon ink or the like. Movable and fixed key contacts 611 and 721 constitute key switches. Namely, movable key contacts 611 are depressed downward together with upper sheet 511 upon operation of input operation portions 512 of upper sheet 511 and are brought into contact with corresponding key contacts 721 on wiring board 522. Laterally elongated opening 665 for receiving thick portion 517a of case body 517 and opening 661 for receiving the upper part of display panel 523 are formed on spacer sheet 516. In addition, laterally elongated key operation openings 664 correspondingly to respective rows of key contacts 611 of upper sheet 511 are formed in a plurality of rows on spacer sheet 516. Movable key contacts 611 of upper sheet 511 face fixed key contacts 721 on wiring board 522 in key operation openings 664 to be separated at a predetermined gap. Openings 667, 668, and 712 having the same shape corresponding to openings 661, 664, and 665 of spacer sheet 516 are formed on sheet 712, and sheet 712 is bonded to the lower surface of spacer sheet 516.

In this intelligent card, electronic component assembly EM, lower cover LM and upper cover UM are produced in separate production lines. Then, these components are assembled such that assembly EM is stored in storage recess 536a formed on case body 517, and upper cover UM and lower cover LM are respectively stored in storage recesses 536a and 536b of case body 517. As shown in FIGS. 13 and 14, wiring board 522 of assembly EM stored in storage recess 536a is supported on the surface of case body 517 while IC/contact unit SE is stored in opening 537c. Contact 515 provided on IC/contact unit SE are received by openings 711, 663, and 514 respectively formed on sheets 518, 519, and 520. Each of outer surfaces of contacts 515 is aligned with that of sheet 520 substantially at the same level. The lower part of IC chip 530 is received by recess 694 of sheet 519, and is carried by sheet 519, as bonded to adhesive sheet 518. Display panel 523 and battery 524 connected to wiring board 522 are respectively received in openings 537a and 537b of case body 517, and their lower part are respectively received by recesses 691 and 692 of sheet 519 and bonded to sheet 519 by adhesive sheet 518. Upper cover UM is received in recess 536a of case body 517 so that the upper surface of upper sheet 511 is on the same level as that of the peripheral portion of case body 517, and is bonded to upper surfaces of wiring board 522, and battery 524 of assembly EM through double-surface adhesive sheet 515. Note that display panel 523 is adhered to upper sheet 511 at its peripheral portion but not remainder portion.

The thickness of the intelligent card will now be described. The thickness of lower sheet 520 of lower cover LM (including the layer of adhesive 562) is 60 $\mu$m, the bottom thicknesses of recesses 691, 692, and 694 of sheet 519 are respectively 40 $\mu$m, and the thickness of double-surface bonding sheet 518 is 50 $\mu$m. The thickness of upper sheet 511 of upper cover UM (including print layer 511a and the layer of adhesive 563) is 80 $\mu$m, the thickness of spacer sheet 514 is 50 μm, and the thickness of sheet 515 is 50 μm. The thickness of wiring board 522 of electronic component assembly EM is 80 μm, and the thickness of IC chip 530 including protective resin 530c is 380 μm. Therefore, the total thickness of the portion in which IC chip 530 is arranged is equal to a thickness corresponding to a sum of a gap (10 μm) between IC chip 530 and wiring board 522 and the sum of the thicknesses of the respective components, i.e., 0.8 mm. The thickness of display panel 523 including reflection plate 523c is 570 μm, and the thickness of paper battery 524 is 470 μm. Therefore, the total thickness of a portion in which display panel 523 and paper battery 524 are arranged is also 0.8 mm.

Embossed characters 506 are formed by embossing thick portions 517a and 517b of case body 517 together with upper and lower sheets 511 and 520 from the upper surface side to the lower surface side of card body 510 by hot press when the intelligent card is issued for a member as a credit card. At this time, magnetic stripe 505 is also provided.

The operation of the intellignet card will be described with reference to the block diagram shown in FIG. 15. The intelligent card is set in a calculator mode when the power source is ON. Upon operation of the mode switch key (to be referred to as an ID key hereinafter) of key input section 120, the card is set in an identification card mode. When the calculator mode is selected, each of key input signals according to operations of input operation portions 512 is stored in a predetermined storage area of RAM 812, controlled by controller 811, and is supplied to display driver 815 to be displayed on display section 13. If the key input signal is an arithmetic signal, a predetermined address of RAM 812 is designated by controller 811, and the content of the designated storage area is sent to arithmetic unit 813. Then, an arithmetic operation is performed by arithmetic unit 813 based on a control instruction from controller 811. The operation result is stored in RAM 812, and is displayed on display section 13 through display driver 815.

When an ID key signal is input and when key discrimination section 810 determines that the key input signal is the ID key signal, the card is set in the identification card mode. In this mode, an enable signal is supplied from controller 811 to EEP-ROM 805, and a PIN (personal identification number) prestored in EEP-ROM 805 is stored in a PIN storage area of RAM 812. Thereafter, controller 811 is set in a PIN collation flow state, and collates a PIN input by operating the numeral keys of key input section 120 with the PIN stored in RAM 812. More specifically, a key code of the key input signal input from key input section 120 is decoded by key discrimination section 810, and thereafter is stored in a collation code storage area of RAM 812. When the ID key is again operated after the PIN is input, controller 811 causes RAM 812 to input the storage content of the start address portion stored in the PIN storage area thereof to one input terminal of arithmetic unit 813, and to input storage content of the start address portion stored in the collation code storage area thereof to the other input terminal of unit 813. Then, controller 811 supplies a PIN collation instruction to arithmetic operation unit 813. In this case, the input gate (not shown) of judging section 816 is opened by a control signal, and the operation result from unit 813 is sent to and held in section 816. The PIN collating operation is repeatedly performed for all the storage contents of the address portions. When the collation result of the last address portion is sent to judging section 816, a signal indicating whether or not both the storage contents coincide with each other is sent to controller 811. When an incoincindence signal is sent, controller 811 causes display section 13 to display a message "PIN NG" through display driver 815. When the PIN is re-input, controller 811 again executes PIN collation. When a coincidence signal is sent from judging section 816, controller 811 causes display section 13 to display a message "PIN OK" through display driver 815, and generates a transmission code corresponding to the coincidence signal. In this case, controller 811 is set in a key input inhibition state. The key input inhibition state is maintained as long as the power source is turned off, and is canceled upon power-off.

The intelligent card subjected to PIN collation therein is inserted in the card terminal, and contacts 515 contact the probe of the terminal, thus allowing data exchange with the terminal. The terminal and the intelligent card exchange the attribute of the identification card prestored in controller 811 and the terminal attribute to determine if communication can be performed. If communication can be performed, a transmission request of the PIN collation result is sent from the terminal to the intelligent card, and the transmission code generated by controller 811 is sent back from the card to the terminal through interface 817. When the transmission code is confirmed by the terminal, credit transaction can be performed as in a conventional IC card.

In the intelligent card, display panel 523 and input key contacts 521 of assembly EM correspond to upper cover UM, so that key input section 12 and display section 13 are arranged on the upper surface side of the card. Contacts 515 of assembly EM are exposed from openings 514 of lower cover LM toward the lower cover outer surface, and are arranged on the lower surface side of the card. Therefore, the card can be inserted in the card terminal while key input section 12 and display section 13 face upward, so that contacts 515 on the lower surface side of the card can be brought into contact with the probe of the terminal. Therefore, when the card is used as an identification card, the card can be easily inserted in the card terminal without being reversed while maintaining a state wherein the function of the card is switched to the identification card mode upon operation of key input section 12.

In the above embodiment, IC chip 530 and contacts 515 are arranged on sub-board 527 to constitute a unit, and IC/contact unit SE is mounted on wiring board 522. IC chip 530 and contacts 515 may be directly mounted on wiring board 522. Movable contacts 524 constituting the key switches may be formed on a sheet member separate from upper sheet 511, and the sheet member may be arranged on wiring board 522 through a spacer. Lower and upper covers LM and UM are not limited to the above-mentioned laminated structure, but can employ an integrated structure. In the above embodiment, the intelligent card having a function of an identification card and a function of a compact electronic calculator has been exemplified. However, the present invention can be applied to an intelligent card having a function of an electronic apparatus other than the compact electronic calculator and a function of the identification card.

What is claimed is:

1. A compact electric apparatus having predetermined upper and lower surfaces and a substantially uniform thickness comprising:

an electronic component assembly including a plurality of key input contacts for inputtting numeral data and collation instruction data, integrated circuit means having memory means for prestoring identification data and control means for collating said identification data with numeral data according to said collation instruction data and for generating a collation result signal, display means connected to said integrated circuit means for displaying a collation result, and battery means for supplying a drive voltage to said integrated circuit means; said electronic component assembly having first and second surfaces;

upper cover means for covering said first surface of said electronic component assembly and including a plurality of key operation portions having means for inputting numeral data and collation instruction data through said key input contacts;

lower cover means for covering said second surface of said electronic component assembly and having a cavity for disposing said electronic component assembly; and fixing means for fixing said electronic component assembly, said upper cover means and said lower cover means together.

2. An apparatus according to claim 1, wherein said fixing means is adhesive.

3. An apparatus according to claim 1, wherein the sizes of said upper and lower surfaces of said apparatus are substantially the same as that of a credit card.

4. An apparatus according to claim 3, wherein said thickness of said apparatus is substantially the same as that of a credit card.

5. An apparatus according to claim 1, wherein said apparatus further has a key input means for inputting arithmetic instruction data, and said integrated circuit means includes arithmetic calculation means for executing an arithmetic operation of numeral data according to said arithmetic instruction data.

6. An apparatus according to claim 5, wherein the sizes of said upper and lower surfaces of said apparatus are substantially the same as that of a credit card.

7. An apparatus according to claim 6, wherein the thickness of said apparatus is substantially the same as that of said credit card.

8. An apparatus according to claim 5, wherein said integrated circuit means is constituted by at least two solid chips, one of which includes said arithmetic calculation means and the other of which includes said memory means prestoring the identification data.

9. An apparatus according to claim 5, wherein said integrated circuit means is constituted by a single solid chip.

10. An apparatus according to claim 1, wherein said upper cover means includes a flexible sheet having key indicia, and a rigid sheet having openings for key operation.

11. An apparatus according to claim 10, wherein said assembly has an insulating board for carrying electric conductive leads which connects said integrated circuit means, said display means and said battery means so as to comprise a predetermined circuit.

12. An apparatus according to claim 11, wherein said assembly further has a number of metal contacts respectively connected to said leads, and one of said upper and lower cover means has openings through which said contacts are externally exposed.

13. An apparatus according to claim 11, wherein said lower cover means includes a frame member for disposing said insulating board of said assembly, and a rigid sheet on which a cavity for disposing said integrated circuit means and said display means of said assembly is formed.

14. An apparatus according to claim 13, wherein said lower cover means has an identification code on an outer surface.

15. An apparatus according to claim 14, wherein said identification data is formed with an embossment.

16. An apparatus according to claim 13, wherein the thickness of said apparatus is substantially the same as that of a credit card.

17. An apparatus according to claim 16, wherein said lower cover means has a magnetic stripe on an outer surface of which identification data is recorded.

18. A compact electronic apparatus comprising:

an electronic component assembly including an insulating substrate having predetermined electric conductive leads, an integrated circuit chip mounted on said insulating substrate and having terminals respectively connected to said conductive leads, and a plurality of metal contacts respectively connected to said terminals of said integrated circuit chip;

case body means for disposing said electronic component assembly, and having a first cavity, a second cavity, an opening for connecting said first cavity to said second cavity, and a thick portion projecting from said first and second cavities; said insulating substrate being disposed in said first cavity;

first cover means for covering one surface of said case body means and including a first reinforcing sheet and a first outer sheet; said first reinforcing sheet having an opening for receiving said thick portion projecting from said first cavity; said first outer sheet covering an outer surface of said first reinforcing sheet; and second cover means for covering the other surface of said case body means and including a second reinforcing sheet and a second outer sheet; said second reinforcing sheet having an opening for receiving said thick portion projecting from said second cavity; said second outer sheet covering an outer surface of said second reinforcing sheet; one of said first and second cover means having an opening for exposing said metal contacts to the outside of said apparatus;

wherein said first outer sheet, said thick portion of said case body, and said second outer sheet are laminated excluding said first and second reinforcing sheets from a region corresponding to said thick portion such that an embossment formed on said thick portion of said case body means is also formed on corresponding portions of said first and second outer sheets.

19. An apparatus according to claim 18, wherein a plurality of key input contacts are formed on said insulating substrate and one of said first and second cover means has key operation portions corresponding to said key input contacts, respectively.

20. An apparatus according to claim 19, wherein said electronic component assembly includes an insulating sheet carried on said insulating substrate, and said integrated circuit chip is mounted on said insulating sheet.

21. An apparatus according to claim 19, wherein said electronic component assembly further includes a display device and a battery cell which are respectively connected to said electric conductive leads and disposed in said opening of said case body means.

22. An apparatus according to claim 18, wherein the size of said apparatus is substantially the same as that of a credit card.

23. A compact electronic apparatus comprising:
an electronic component assembly including a thin insulating substrate, a plurality of metal foil contacts formed on said insulating substrate, an integrated circuit chip having a plurality of terminals some of which are connected to said metal foil contacts, a plurality of key input contacts, a display device, a battery cell and electric conductive leads which connect the rest of said terminals of said integrated circuit chip, said key contacts, said display device and said battery cell so as to comprise a predetermined circuit;
upper cover means for covering an upper surface of said electronic component assembly and including an uppermost sheet with a plurality of key input portions which are depressible toward said key contacts, respectively, and key indicia each of which is printed on each of said key input portions; and
lower cover means for covering a lower surface of said electronic component assembly; one of said upper and lower cover means having an opening for exposing said metal foil contacts to the outside of said apparatus.

24. An apparatus according to claim 23, wherein said integrated circuit chip includes an identification circuit means for identifying prestored identification data with input data inputtted through said key input contacts and for generating a collation result signal, and control circuit means for instructing said display device to provide a display corresponding to the collation result signal.

25. An apparatus according to claim 24, wherein said key input portions include an arithmetic key input means for inputting arithmetic instruction data, and said integrated circuit chip includes arithmetic calculation means for executing an arithmetic operation of numeral data according to said arithmetic instruction data.

26. An apparatus according to claim 25, wherein said electronic component assembly includes two integrated circuit chips, one of which includes said identification circuit means and the other of which includes said arithmetic calculation means.

27. An apparatus according to claim 23, wherein said key input contacts and said electric conductive leads are formed on said insulating substrate.

28. An apparatus according to claim 23, wherein said electronic component assembly includes an insulating sheet carried by said insulating substrate, and said integrated circuit chip is mounted on said insulating sheet.

29. An apparatus according to claim 28, wherein said electronic component assembly includes anisotropically electric conductive adhesive which electrically connects said terminals of said integrated circuit chip to said electric conductive leads.

30. An apparatus according to claim 23, wherein said upper cover means includes a metal sheet which is disposed between said uppermost sheet and said electronic component assembly; said metal sheet having an opening opposed to said display device.

31. An apparatus according to claim 30, wherein said opening for exposing said metal foil contacts to the outside of the apparatus is formed in said metal sheet and said uppermost sheet.

32. An apparatus according to claim 30, wherein said lower cover means includes a metal sheet in which an opening exposes the metal foil contacts to the outside of said apparatus.

* * * * *